United States Patent
Nakanishi et al.

(10) Patent No.: US 6,662,637 B1
(45) Date of Patent: Dec. 16, 2003

(54) ENGINE TESTING APPARATUS AND MAP PREPARING METHOD FOR AN ENGINE TESTING APPARATUS/VEHICLE TESTING APPARATUS

(75) Inventors: Hideki Nakanishi, Miyanohigashi-machi (JP); Shinji Noguchi, Miyanohigashi-machi (JP); Yasuhiro Ogawa, Miyanohigashi-machi (JP)

(73) Assignee: Horiba, Ltd, Kyoto (JP)

( * ) Notice: Subject to any disclaimer, the term of this patent is extended or adjusted under 35 U.S.C. 154(b) by 0 days.

(21) Appl. No.: 09/559,152

(22) Filed: Apr. 26, 2000

(30) Foreign Application Priority Data

Apr. 30, 1999 (JP) .............................. 11-123874
May 14, 1999 (JP) .............................. 11-134260
May 14, 1999 (JP) .............................. 11-134302

(51) Int. Cl.$^7$ .............................. G01L 3/26; G01L 3/00
(52) U.S. Cl. .......................... 73/116; 73/117; 73/862.08
(58) Field of Search .................. 73/116, 146, 117, 73/862.18, 862.16, 862.13, 862.09, 862.08, 117.1, 117.2, 117.3; 701/1, 22; 123/435

(56) References Cited

U.S. PATENT DOCUMENTS 5,107,815 A * 4/1992 Van Duyne ................. 123/435
5,195,038 A * 3/1993 Yagi et al. ............. 364/431.05

* cited by examiner

Primary Examiner—Hezron Williams
Assistant Examiner—Maurice Stevens
(74) Attorney, Agent, or Firm—Oppenheimer Wolff & Donnelly; Brian F. Swienton

(57) ABSTRACT

The present invention provides a map preparing method for an engine testing apparatus or a vehicle testing apparatus capable of preventing a peculiar driving state from being generated. The method includes varying a throttle valve from its fully closed position to its fully opened position while maintaining a constant engine rotation number, carrying out operation for storing an output torque $N_m$ at that time using at least three kinds of different engine rotation numbers, determining each obtained torque curves A~E as actual machine data, and preparing a map based on the actual machine date. The map is prepared by describing each of the torque curves A~E on the same X–Y plane based on the actual machine data, converting actual machine data function for describing torque approximation curves a~e with respect to throttle opening degrees (X axis) on the same X–Y plane while making approximations to the torque curves determining the existence of intersecting torque approximation curves a~e and automatically correcting one of the torque approximation curves c which can be determined peculiar such that a value $Y_1$ of y-component of the torque approximation curve c which appears peculiar among the intersecting torque approximation curves b and c in the determining step assumes a median value $Y_2$, $Y_3$ of values of y-components of the vertically adjacent torque approximation curves b and d.

3 Claims, 10 Drawing Sheets

FIG. 7
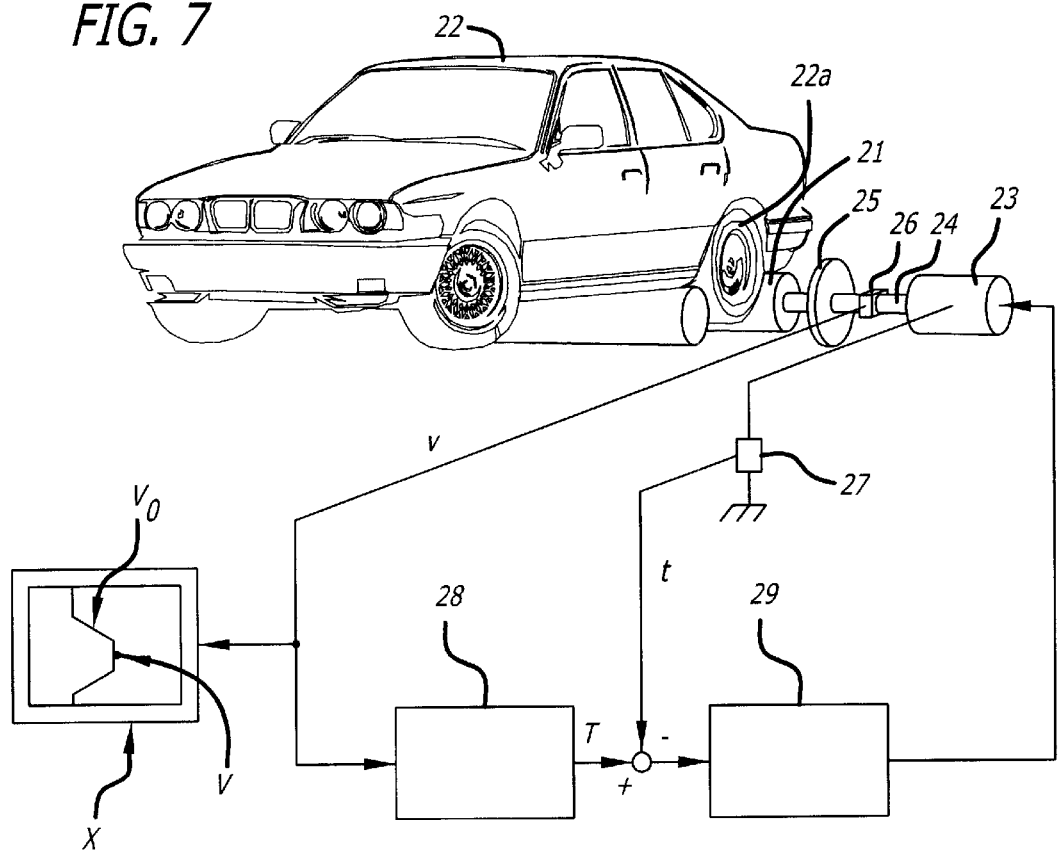
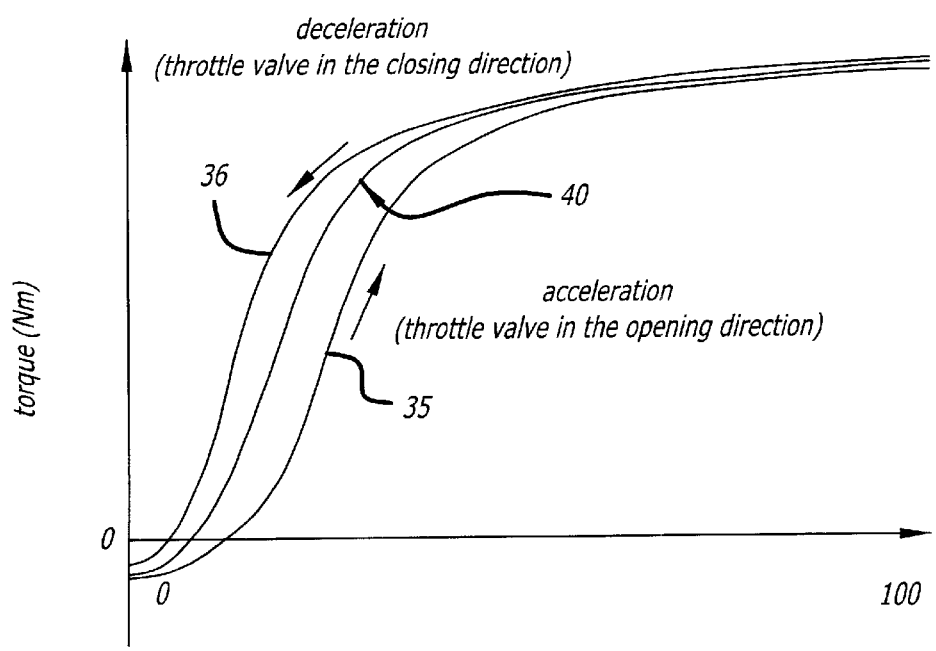
FIG. 8

ENGINE TESTING APPARATUS AND MAP PREPARING METHOD FOR AN ENGINE TESTING APPARATUS/VEHICLE TESTING APPARATUS

FIELD OF THE INVENTION

The present invention relates to an engine testing apparatus and further relates to a map preparing method for the engine testing apparatus or a vehicle testing apparatus. More particularly, the invention relates to a novel map preparation method in which learned data (actual machine data) or a learning map for determining a throttle (accelerator) opening degree, which is a target valve for controlling an engine under test or a vehicle under test, is defined as an exponential function or a multiple-degree equation function. Thereby, a peculiar point of the learned data is determined, and the particular point is automatically corrected when preparing the learning map.

The present invention further relates to a novel map preparation method that uses data from a torque curve obtained by varying the throttle valve from a fully closed position to a fully open position while maintaining a constant engine rotation number and that uses data from a torque curve obtained by varying the throttle valve from a fully open position while maintaining a constant engine rotation number. The data is used to prepare a learning map for determining a throttle (accelerator) opening degree which is a target value for controlling an engine under test of a vehicle under test.

DESCRIPTION OF THE PRIOR ART

A conventional vehicle simulation system carried out on a stage includes a function for learning an engine under test (simply "engine", hereinafter), and a learning map is prepared from the learned data. The engine is controlled based on the learning map.

The learned data is prepared by varying the throttle valve with the engine at an arbitrary rotation number and by storing an output torque (see FIG. 6). FIG. 6 shows a torque curve (actual measured value) obtained by varying the throttle valve from a fully closed position to a fully open position while maintaining the engine rotation number at a constant value. From the torque curve, a torque value is determined at one point with respect to the throttle valve opening degree at a certain engine rotation number (e.g., 2000 rpm).

However, since torque curves A, B, C, D and E of various engine rotation numbers (1000 rpm, 1500 rpm, 2000 rpm, 2500 rpm, 3000 rpm) intersect at a low throttle opening degree in some cases, a peculiar portion is generated in a learning map based on the learned data, and accuracy of the control is deteriorated. For example, a peculiar driving state in which the throttle is closed for acceleration is generated. A first invention has been accomplished in view of the above circumstances, and an object of the first invention is to provide a map preparing method for an engine testing apparatus or a vehicle testing apparatus capable of preventing a peculiar driving state from being generated.

A throttle valve is varied while maintaining an engine at an arbitrary rotation number (e.g., 1500 rpm), and an output torque curve at the arbitrary rotation number is stored. The obtained output curves are determined as learned data 40, and the learning map is prepared based on the learned data 40 (see FIG. 8). Table 1 shows the learning map prepared by the conventional method.

TABLE 1

| $N_m$ | Rpm 1500 | Rpm 2000 | Rpm 2500 | Rpm 3000 | Rpm 3500 |
|---|---|---|---|---|---|
| −40 | 0 | 0 | 0 | 0 | 0 |
| −35 | 0 | 0 | 0 | 0 | 0 |
| −30 | 0 | 0 | 0 | 0 | 0 |
| −25 | 0 | 0 | 0 | 163 | 276 |
| −20 | 0 | 43 | 110 | 260 | 343 |
| −15 | 28 | 132 | 200 | 325 | 430 |
| −10 | 80 | 190 | 279 | 392 | 460 |
| −5 | 133 | 242 | 339 | 407 | 475 |
| 0 | 175 | 295 | 362 | 430 | 512 |
| 20 | 324 | 430 | 512 | 587 | 678 |
| 40 | 459 | 558 | 654 | 737 | 813 |
| 60 | 572 | 678 | 775 | 888 | 978 |
| 80 | 721 | 813 | 910 | 1045 | 1143 |
| 100 | 925 | 1060 | 1157 | 1261 | 1345 |
| 120 | 1359 | 1525 | 1524 | 1592 | 1675 |
| 140 | 4096 | 4096 | 4096 | 3054 | 2552 |
| 160 | 4096 | 4096 | 4096 | 4096 | 4096 |
| 180 | 4096 | 4096 | 4096 | 4096 | 4096 |
| 200 | 4096 | 4096 | 4096 | 4096 | 4096 |

From the learning map of Table 1, an output torque (simply "torque", hereinafter) is determined at one point with respect to a particular engine rotation number and a particular throttle opening degree. For example, when the target engine rotation number is 1700 rpm and the desired target torque $N_m$ is 30, the throttle opening degree for generating the target torque $N_m$ can be determined from the values 329, 464, 435 and 563 by referring to the learning map of Table 1.

Conventionally, the throttle opening degree is controlled by varying the throttle valve from the fully closed position to the fully opened position, and the throttle opening degree is increased stepwise, for example, at 5% increments. Whenever the throttle opening degree is increased by 5%, it is necessary to wait until the torque is stabilized. The torque value is stored when it is stabilized.

However, when the engine is held at a constant rotation number and the throttle openings are the same, a torque output resulting from a throttle valve operated in the opening direction differs from a torque output resulting from the throttle valve operated in the closing direction. On the other hand, the conventional learned data can be obtained only when the throttle valve is fixed and the torque is stabilized as described above. Therefore, it is not possible to obtain a learning map corresponding to a variation in speed during a running speed pattern of a driving mode.

For example, it can be found from FIG. 11 that actual vehicle data 38, which exhibits variations in throttle opening degree of an actual vehicle running on a chassis dynamo based on a running speed pattern I of a driving mode, intersects data 39, which is data simulated according to the conventional method. In FIG. 11, the pattern I is constituted by constant speed straight lines f, h, k, o, r, w, x, acceleration straight lines g, j, l, q and deceleration straight lines i, p, s and u.

That is, from FIG. 11, the following points can be found:

(1) For example, with respect to acceleration straight line j, data 38 does not coincide with data 39. That is, since an output torque with respect to a throttle opening degree operated while referring to the learning map and a torque necessary for acceleration do not coincide with each other, data 39 is deviated higher than data 38 in the first half. In order to correct the deviation of vehicle speed, data 39 is deviated lower than the data 38 in the latter half.

(2) A reversal exists in the vertical relation between data 38 and data 39 in the case of the acceleration straight line j and the vertical relation between data 38 and data 39 in the case of the deceleration straight line p.

(3) The same phenomenon exists in the acceleration straight line g and the deceleration straight line s.

In this manner, since the accuracy of the simulation is poor, it is difficult to accurately drive an engine with respect to the running speed pattern I of the driving mode.

A second invention has been accomplished in view of the above circumstances, and an object of the second invention is to provide a map preparing method for an engine testing apparatus or a vehicle testing apparatus capable of enhancing the simulation accuracy.

To verify the performance of an automobile engine, there exists an engine testing apparatus comprising a dynamometer connected to an output section of an engine which is to be tested, a dynamo controller for controlling the dynamometer, and an actuator for controlling a throttle opening degree of the engine under test. The engine testing apparatus controls the dynamo controller and the actuator to adjust the output of the engine under test.

In the conventional engine testing apparatus, the rotation of the dynamometer is controlled by the dynamo controller, the throttle valve of the engine under test is controlled and operated, and the output torque of the engine under test is controlled, thereby simulating the actual vehicle running.

However, the conventional engine testing apparatus does not have a function for controlling the temperature of the peripheral portions of the engine under test such as engine cooling water temperature, fuel temperature, air intake temperature, exhaust gas temperature and lubricant temperature. Therefore, the temperature environment of an actual vehicle can not be reproduced, and engine behavior similar to the actual vehicle can not be obtained. Thus, high simulation accuracy can not be obtained.

A third invention has been accomplished in view of the above circumstances. The object of the third invention is to provide an engine testing apparatus capable of simulating an actual running vehicle with high accuracy.

SUMMARY OF THE INVENTION

The first invention comprises varying a throttle valve from the fully closed position to the fully open position while maintaining an engine at a constant rotation, carrying out an operation of storing an output torque using at least three different engine rotation numbers, determining torque curves for each of the engine rotation numbers as actual machine data, and preparing a map based on the actual machine date. The preparation of the map is characterized by describing each of the torque curves on the same X–Y plane when a map is prepared based on the actual machine data, converting actual machine data function for describing torque approximation curves with respect to throttle opening degrees (X axis) on the same X–Y plane while making approximations to the torque curves, determining the existence of intersecting torque approximation curves, and automatically correcting the torque approximation curve which is determined peculiar such that a value of a y-component of the peculiar torque approximation curve assumes a median value of the y-component of each of the vertically adjacent torque approximation curves.

The second invention comprises calculating an average value of throttle valve operating speed from variation of the throttle valve operation speed, determining the average value of the throttle valve operating speed obtained by the calculation as a representative value corresponding to the throttle valve operating speed in a driving mode, operating the throttle valve in a state where the engine rotation number is made constant by the representative value, describing the torque curves with a plurality of engine rotation numbers, and preparing a map for determining the throttle opening degree based on the obtained torque curves.

According to another aspect of the second invention, a map preparing method is provided. The map preparing method is used for an engine testing apparatus or a vehicle testing apparatus. The map preparing method comprises calculating an average value of the throttle valve opening direction and an average value of the throttle valve closing direction from variations of the throttle valve operation speed, determining the average value of the throttle valve opening direction obtained by the calculation as a representative value corresponding to the throttle valve operating in the throttle valve opening direction in a driving mode, operating the throttle valve in the opening direction in a state where the engine rotation number is held constant by the representative value and describing the torque curves with a plurality of different engine rotation numbers, and preparing a map of the throttle valve opening direction based on the obtained torque curves, determining the average value of the throttle valve in the throttle valve closing direction obtained by the calculation as a representative value corresponding to the throttle valve operating in the throttle valve closing direction in a driving mode, operating the throttle valve in the closing direction in a state where the engine rotation number is held constant by the representative value and describing the torque curves with a plurality of different engine rotation numbers, and preparing a map in the throttle valve closing direction based on the obtained torque curves.

According to the third invention, an engine testing apparatus is provided. The engine testing apparatus comprises a dynamometer connected to an output section of an engine which is to be tested, a dynamo controller for controlling the dynamometer, and an actuator for controlling a throttle opening degree of the engine under test. The dynamo controller and the actuator are controlled to adjust an output of the engine under test, wherein commands based on a temperature pattern obtained from temperature data of various portions of the engine while running an actual vehicle in accordance with a running pattern on a chassis dynamo from an apparatus for controlling the entire apparatus to various temperature adjusting devices provided around the engine under test.

An apparatus for controlling the engine testing apparatus outputs, for example, commands based on the temperature pattern obtained from temperature data of various portions of the actually running engine in accordance with the running pattern on the chassis dynamo to various temperature adjusting devices provided around the engine under test. Thus, it possible to reproduce the temperature environment of the actual vehicle and obtain an engine behavior similar to the actual vehicle. Therefore, high simulation accuracy can be obtained.

The commands based on the temperature pattern may be based on a virtual vehicle simulation. In this case, it is possible to arbitrarily carry out the simulation of a virtual vehicle by adding various conditions.

BRIEF DESCRIPTION OF THE DRAWINGS

FIG. 7 is a schematic view illustrating one example of a vehicle testing apparatus to which the first and second invention can be applied;

FIG. 8 is a graph showing learned data for preparing a learning map of an embodiment of the second invention and learned data for preparing a conventional learning map;

DETAILED DESCRIPTION OF THE PREFERRED EMBODIMENTS

An embodiment of a first invention is described below with reference to the drawings.

Figure 1:
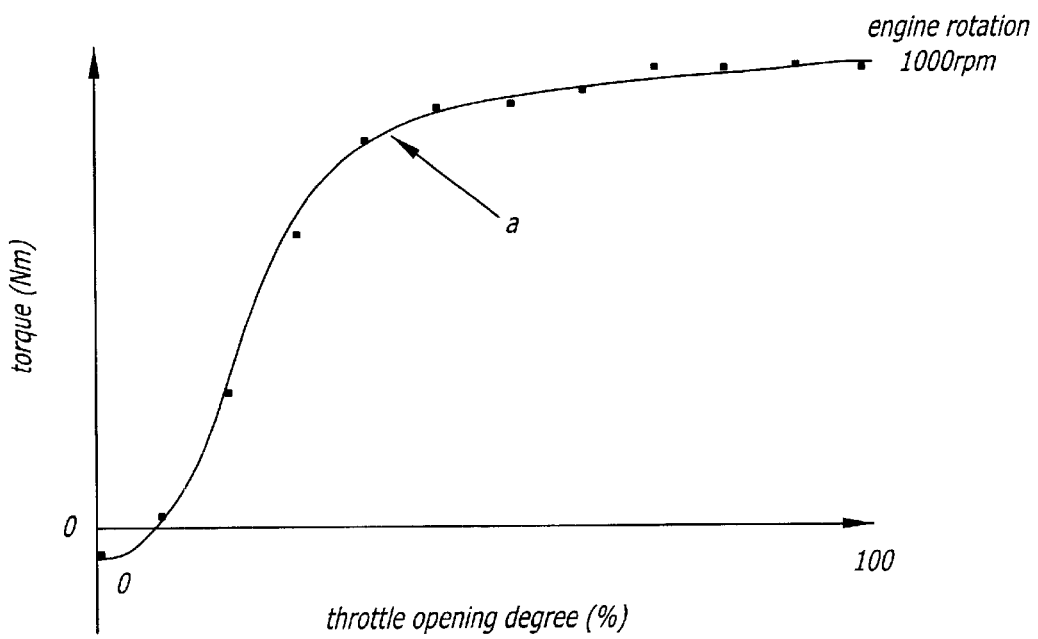
FIG. 1 is a characteristic graph showing a torque approximation curve obtained by converting a torque curve with respect to a specific engine rotation number using an exponential function approximation method according to an embodiment of a first invention.
Figure 6:
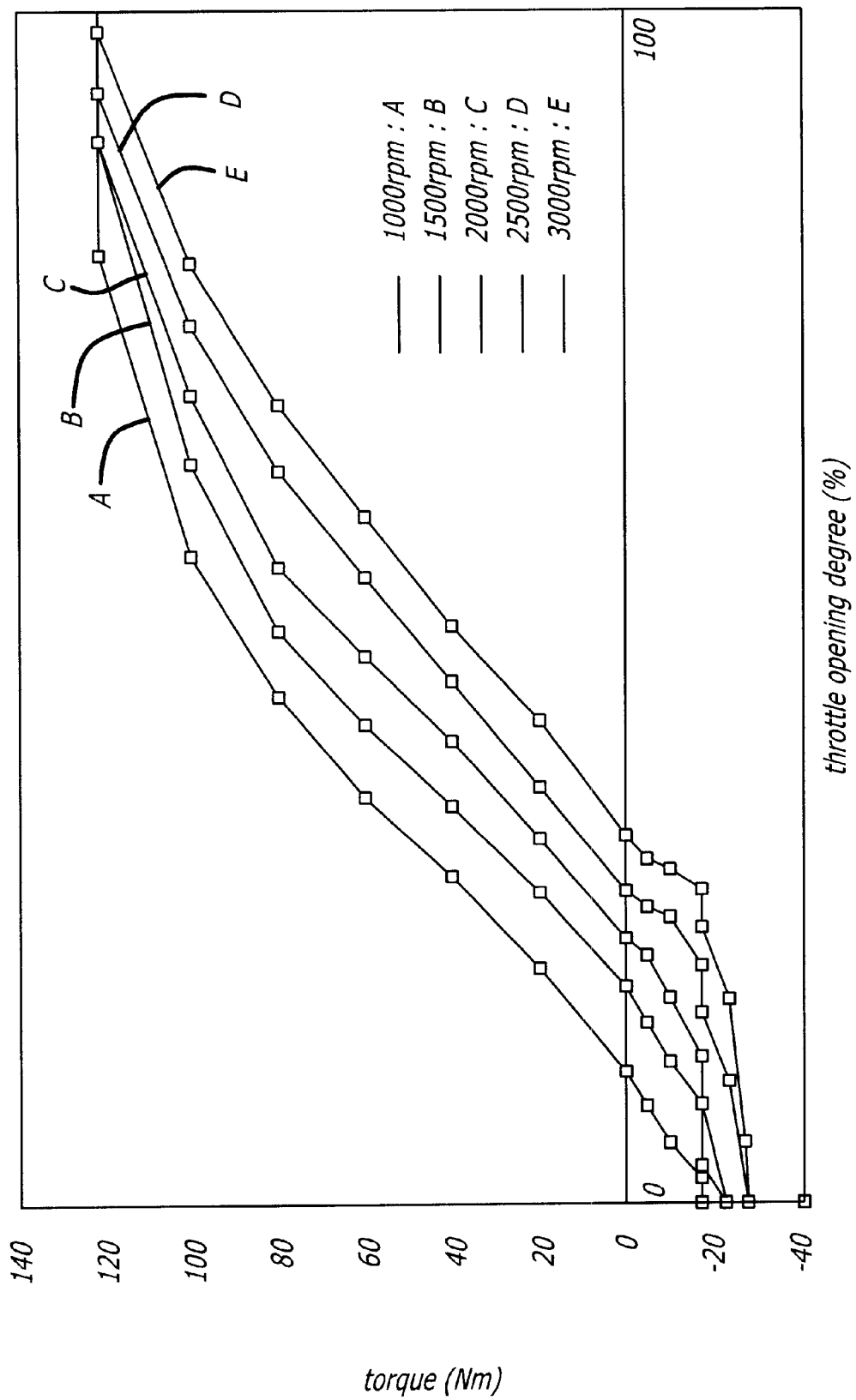
FIG. 6 is a characteristic graph showing torque curves corresponding to actual machine data used in each of the embodiments.

FIG. 1 shows a torque approximation curve a obtained by functionally converting a torque curve A, where the engine rotation number is 1000 rpm, among torque curves A, B, C, D, and E as actual machine data shown in FIG. 6 an using an exponential function approximation method. The torque curves A, B, C, D, and E can be obtained from an engine testing apparatus 1 (which will be described later) constituting a vehicle simulation system carried out on a stage.

Figure 2:
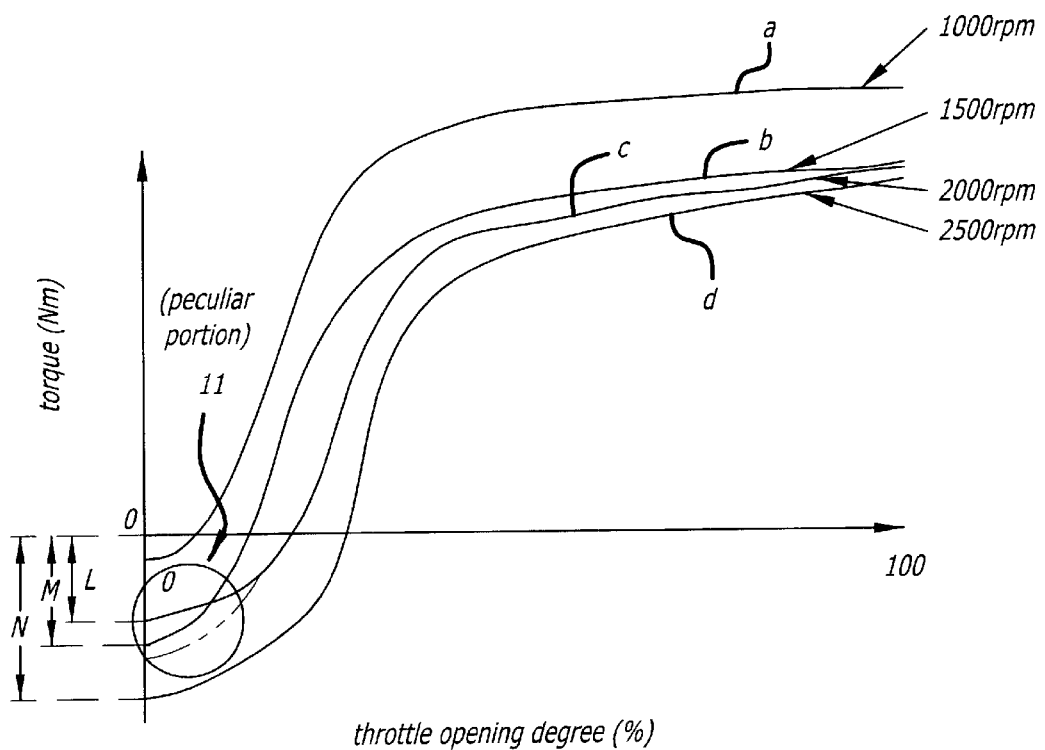
FIG. 2 is a characteristic graph showing torque approximation curves obtained by converting torque curves with respect to a plurality of engine rotation numbers into functions using the exponential function approximation method of FIG. 1.

In FIG. 2, torque approximation curves a, b, c, and d obtained by functionally converting torque curve A, where the engine rotation number is 1000 rpm, torque curve B where the engine rotation number is 1500 rpm, torque curve C where the engine rotation number is 2000 rpm, and torque curve D where the engine rotation number is 2500 rpm (see FIG. 6). The torque curves A, B, C, D and E are shown on the same X–Y plane.

Figure 3:
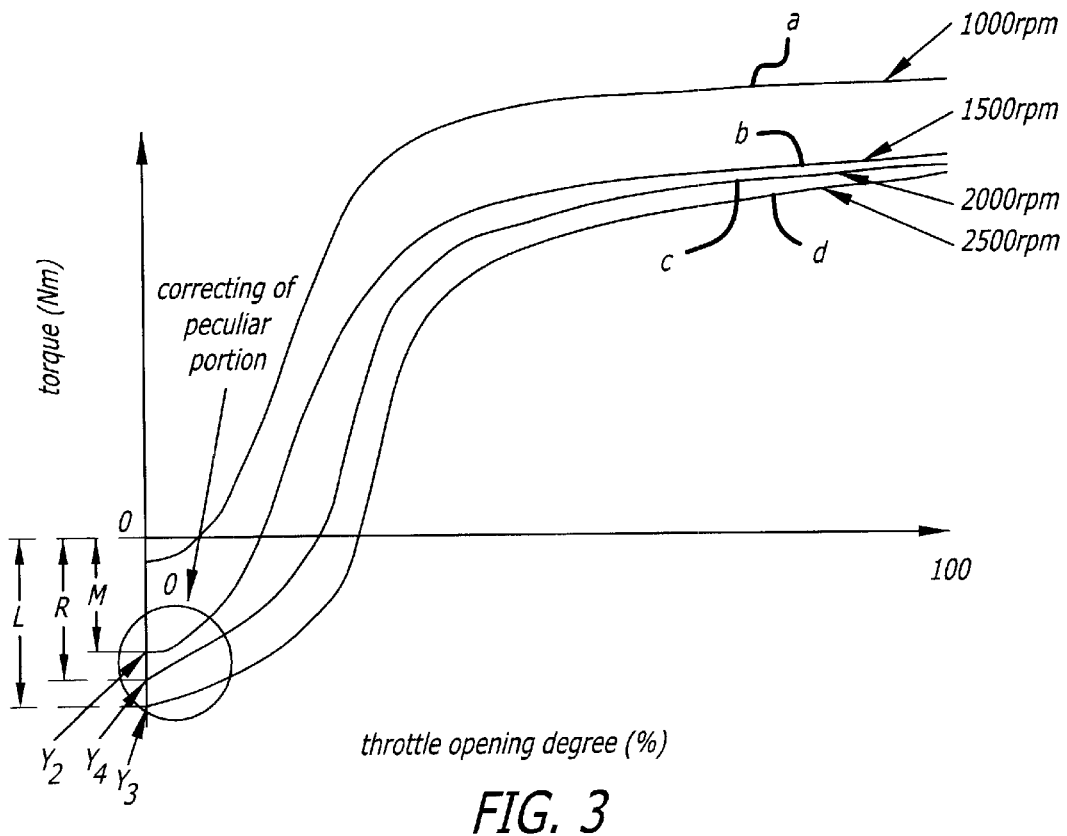
FIG. 3 is a characteristic graph showing torque approximation curves utilized for preparing a learning map required for control in which intersecting portions generated at lower portions of the throttle opening degree are deleted according to the above embodiment.

Of the torque approximation curves b an c intersecting in FIG. 2, the torque approximation curve c is defined as a peculiar curve. Curve C is automatically corrected, and FIG. 3 shows a characteristic view of automatically corrected torque approximation curve c'.

Figure 4:
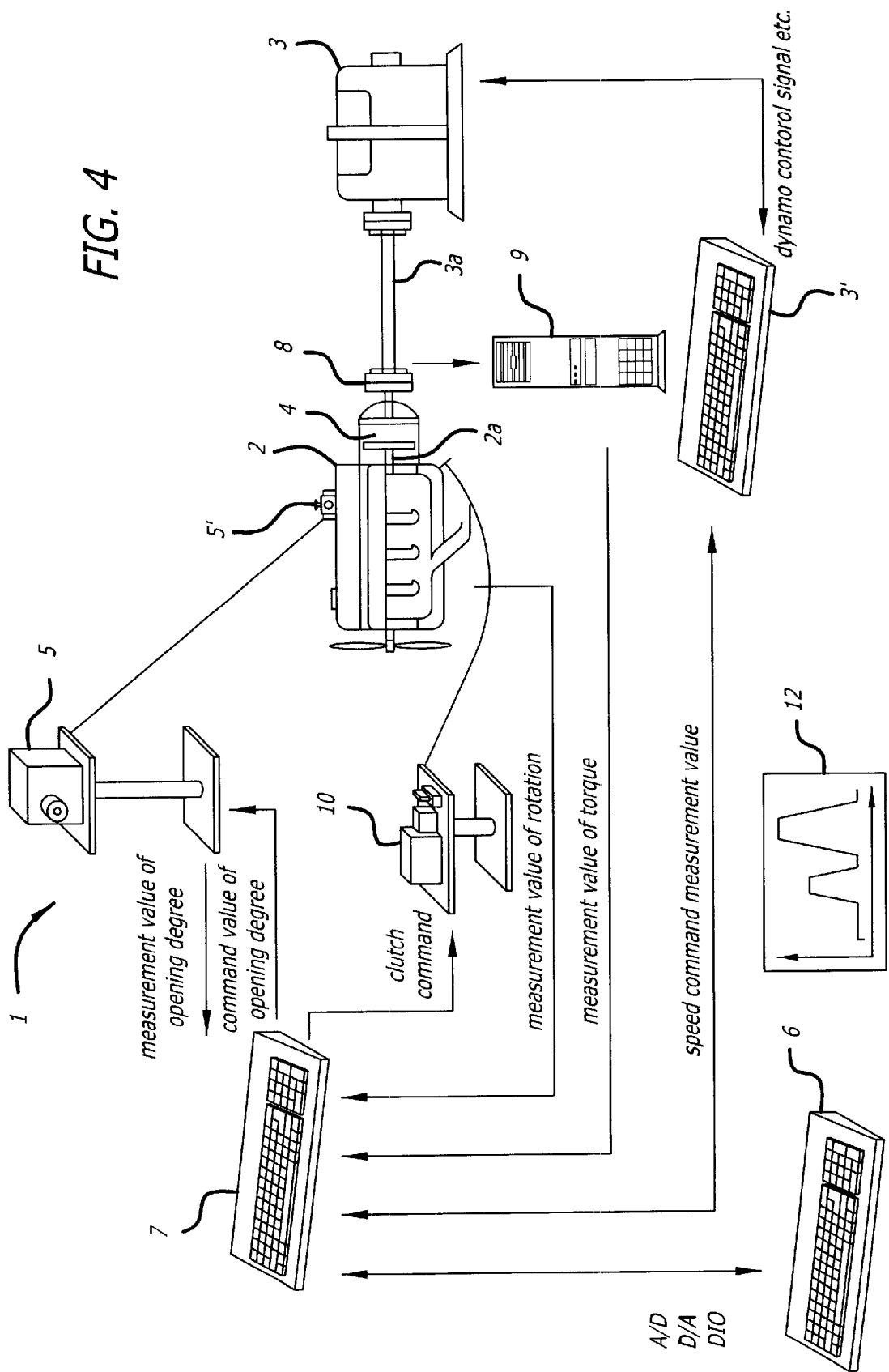
FIG. 4 is a schematic view illustrating an engine testing apparatus according to the first, second and third inventions.

FIG. 4 shows the engine testing apparatus 1. In FIG. 4, an output shaft 2a of an engine 2 under test (simply "engine" hereinafter) and a driving shaft 3a of a dynamometer 3 are detachably connected to each other through a clutch 4. A dynamo controller 3' controls the dynamometer 3. A throttle actuator 5 controls the throttle opening degree of the engine 2. A computer 6 controls the dynamo controller 3' and the throttle actuator 5 through an interface 7.

Symbols 8 and 9 respectively represent a torque measuring device and a torque amplifier. Symbol 11 represents a clutch actuator. Symbol 12 represents a target vehicle speed pattern.

As a first step for preparing a learning map, actual machine data (learned data) is prepared. The actual machine data is raw data obtained by varying the engine condition on engine dynamo. That is, an operation for varying the throttle valve from the fully closed position to the fully opened position, while maintaining the engine rotation number at a constant and storing the output torque, is carried out at the following engine rotation numbers: 1000 rpm, 1500 rpm, 2000 rpm, 2500 rpm and 3000 rpm. The output torque is stored in the computer 6. FIG. 6 shows torque curves A, B, C, D, and E described on the same X–Y plane. The obtained torque curves A, B, C, D, and E correspond to respective engine rotation numbers.

Next, in the first embodiment, the torque curves A, B, C, D, and E are functionally converted by an exponential function approximation method.

Next, it is determined whether torque approximation curves a, b, c, d (see FIG. 2), which are functionally converted and described on the same X–Y plane, are intersecting. As shown in FIG. 2, since the torque approximation curve e, which corresponds to the torque curve E, does not intersect with torque approximation curves a, b, c, d, the torque approximation curve e is omitted.

As shown in FIG. 2, it can be seen that the torque approximation curves b and c are intersecting at a low portion of the throttle opening degree. A value of the y-component of the torque approximation curve c is defined as $Y_1$, wherein $|Y_1|=L$. A value of the y-component of the torque approximation curve b is defined as $Y_2$, wherein $|Y_2|=M$. A value of the y-component of the torque approximation curve d is defined as $Y_3$, wherein $|Y_3|=N$. Herein, $L<M<N$.

One of the intersecting torque approximation curves b and c is defined as peculiar and automatically corrected.

FIG. 3 shows a case in which the torque approximation curve c is defined as peculiar, and it is automatically corrected. In this case, it is considered that the torque approximation curve c is sandwiched between the torque approximation curves b and c over the entire throttle opening degree (X axis) except peculiar portion (intersecting portion) 11 intersecting with the torque approximation curve b.

The torque approximation curve c is re-defined as a torque approximation curve c' (see FIG. 3) such that the value of the y-component of the torque approximation curve c assume a median value of the torque approximation curves b and d sandwiching the torque approximation curve c, thereby carrying out the automatic correction. That is, as shown in FIG. 3, a value of the y-component of the torque approximation curve c' is $Y_4$, wherein $|Y_4|=R=(L+M)/2$.

The intersecting portion 11 generated at the low portion of the throttle opening degree can be deleted, and it is possible to prepare a learning map necessary for control in which a peculiar portion 11 is deleted from all torque approximation curves a, b, c, d, angle.

From the learning map, a preferred target throttle (accelerator) opening degree for engine control can be determined. For example, when the target engine rotation number is 1700 rpm and the desired target torque $N_m$ is 30, the throttle (accelerator) opening degree for generating from the target torque $N_m$ can be determined from values of 329, 464, 435 and 563 by referring to the learning map shown in Table 2.

TABLE 2

| $N_m$ | rpm 1500 | rpm 2000 | rpm 2500 | rpm 3000 | rpm 3500 |
|---|---|---|---|---|---|
| −40 | 0 | 0 | 0 | 0 | 0 |
| −35 | 0 | 0 | 0 | 0 | 0 |
| −30 | 0 | 0 | 0 | 0 | 0 |
| −25 | 0 | 0 | 0 | 165 | 278 |
| −20 | 0 | 45 | 112 | 262 | 345 |
| −15 | 30 | 135 | 202 | 330 | 435 |
| −10 | 82 | 195 | 284 | 397 | 465 |
| −5 | 135 | 247 | 344 | 412 | 480 |
| 0 | 180 | 300 | 367 | 435 | 517 |
| 20 | 329 | 435 | 517 | 592 | 683 |
| 40 | 464 | 563 | 659 | 742 | 818 |
| 60 | 577 | 683 | 780 | 893 | 983 |
| 80 | 726 | 818 | 915 | 1050 | 1148 |
| 100 | 930 | 1065 | 1162 | 1266 | 1350 |
| 120 | 1364 | 1530 | 1529 | 1597 | 1680 |
| 140 | 4096 | 4096 | 4096 | 3059 | 2557 |
| 160 | 4096 | 4096 | 4096 | 4096 | 4096 |
| 180 | 4096 | 4096 | 4096 | 4096 | 4096 |
| 200 | 4096 | 4096 | 4096 | 4096 | 4096 |

Figure 5:
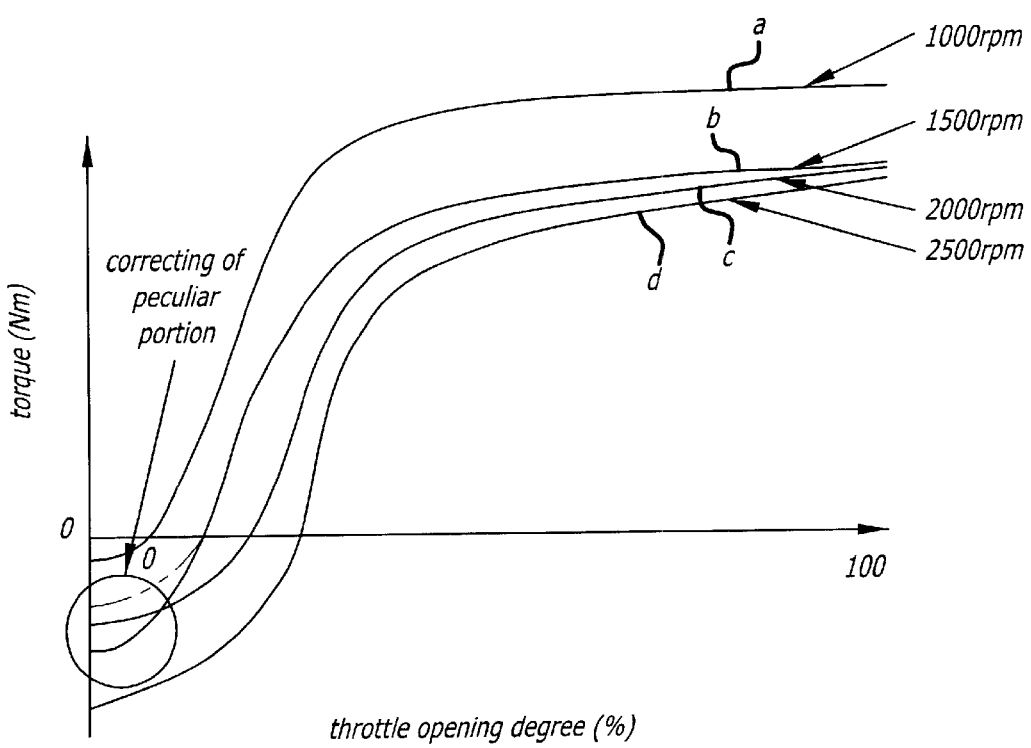
FIG. 5 is a characteristic graph showing torque approximation curves obtained by converting torque curves with respect to a plurality of engine rotation numbers using an exponential function approximation method according to another embodiment of the first invention.

As another embodiment, the torque approximation curve b can be defined as peculiar, and this may be automatically corrected as shown in FIG. 5. In this case, the torque approximation curve b is sandwiched between the torque approximation curves a and c over the entire throttle opening degree (X axis) except peculiar portion (intersecting portion) 11 intersecting with the torque approximation curve c.

In the above embodiment, a single peculiar portion (intersecting portion) 11 is illustrated. However, the present invention can also be applied to a case having a plurality of peculiar portions (intersecting portion). In this case, the above-described technique may be repeated by the number of the peculiar portions (intersecting portion) until the peculiar portions (intersecting portion) disappear.

In each of the above embodiments, the learning map preparing method is applied to the engine testing apparatus 1. However, the first invention can also be applied to a vehicle testing apparatus using a chassis dynamometer.

FIG. 7 shows one example of a vehicle testing apparatus. Symbol 21 represents a rotation roller on which driving wheel 22a of a vehicle 22 under test is mounted. Symbol 23 represents a chassis dynamometer operatively connected to the rotation roller 21 through a shaft 24. The chassis dynamometer 23 corresponds to the dynamometer 3 of the engine testing apparatus 1. Symbol 25 represents a flywheel provided on a shaft 24, and symbol 26 represents a speed sensor provided on the shaft 24. The speed sensor 26 corresponds to a sensor (not shown) for outputting a rotation measurement value for the engine testing apparatus 1 shown in FIG. 4. The sensor is provided in an engine 2 of the engine testing apparatus 1 shown in FIG. 4. Symbol 27 represents a torque sensor provided in the chassis dynamometer 23. The torque sensor 27 corresponds to the torque measuring device 8 of the engine testing apparatus 1. Symbol 28 represents a running resistance generator for generating a target running resistance signal T corresponding to an actual running speed signal v sent from the speed sensor 26. Symbol 29 represents a chassis dynamo controller for driving and controlling the chassis dynamometer 23 such that a running resistance (target running resistance) corresponding to the actual running speed is applied to the driving wheel 22a based on a difference signal between an actual running resistance signal t sent from the torque sensor 27 and a target running resistance signal T sent from the running resistance generator 28. Symbol X represents a driver's aid display unit on which a set target driving pattern $V_o$ (target vehicle speed pattern 12 in FIG. 4) and a variation of data position V showing a real time driving state (actual running speed signal v of current time sent from the speed sensor 26) are displayed for the driver of the vehicle.

As described above in accordance with the first invention, learning data (actual machine data), which are based on a learning map for determining a throttle (accelerator) opening degree which is a target value for controlling an engine under test or a vehicle test is defined as an exponential function or a multiple-degree equation function, thereby finding a peculiar point. The peculiar point is automatically corrected when preparing the learning map. Therefore, a map without peculiar portions (intersecting portion) can be made. As a result, the control accuracy is enhanced.

An embodiment of a second invention is described below.

Figure 9:
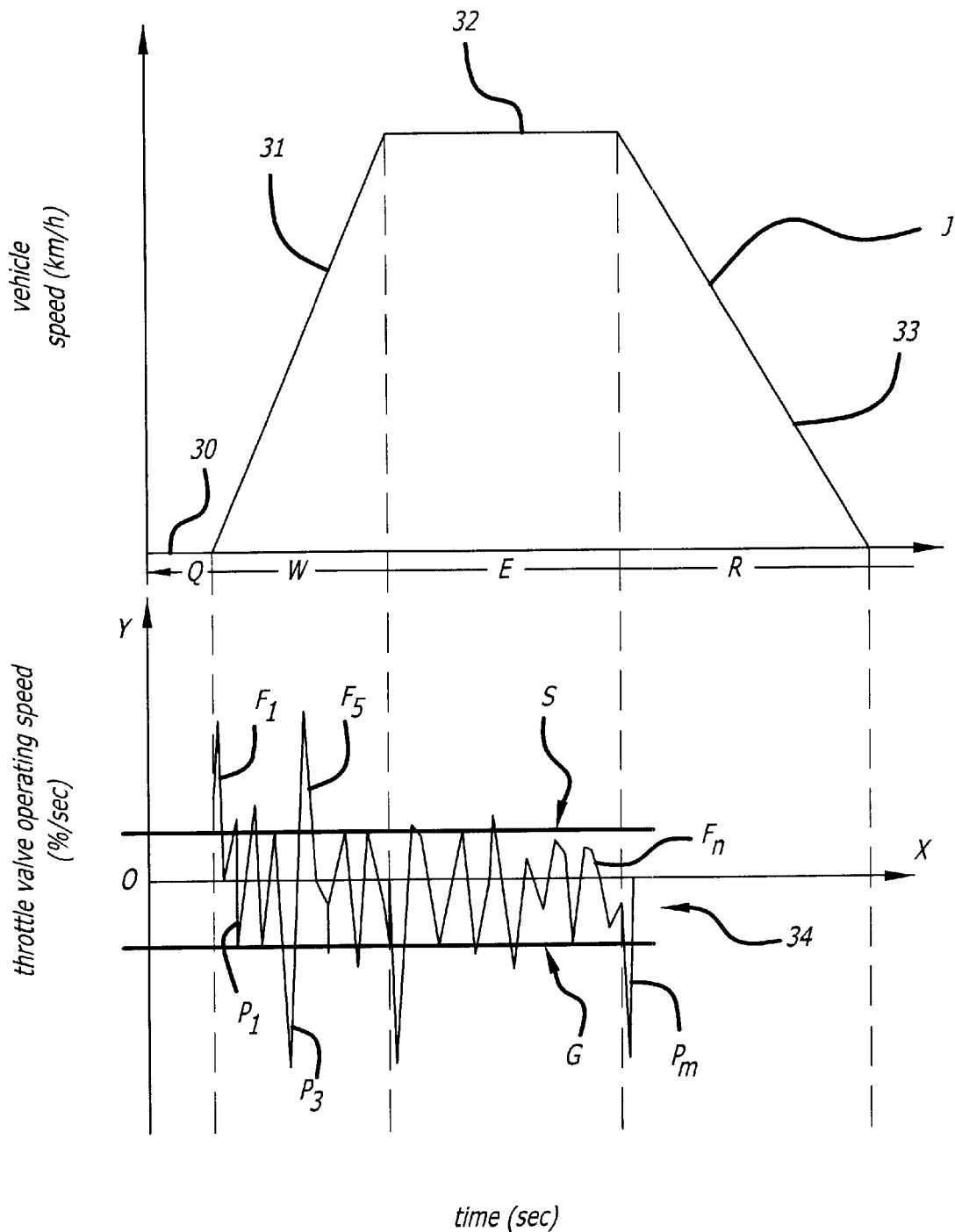
FIG. 9 is a graph showing a variation in throttle valve operation speed obtained from the actual vehicle running on a chassis dynamo based on a running speed pattern of a driving mode.
Figure 10:
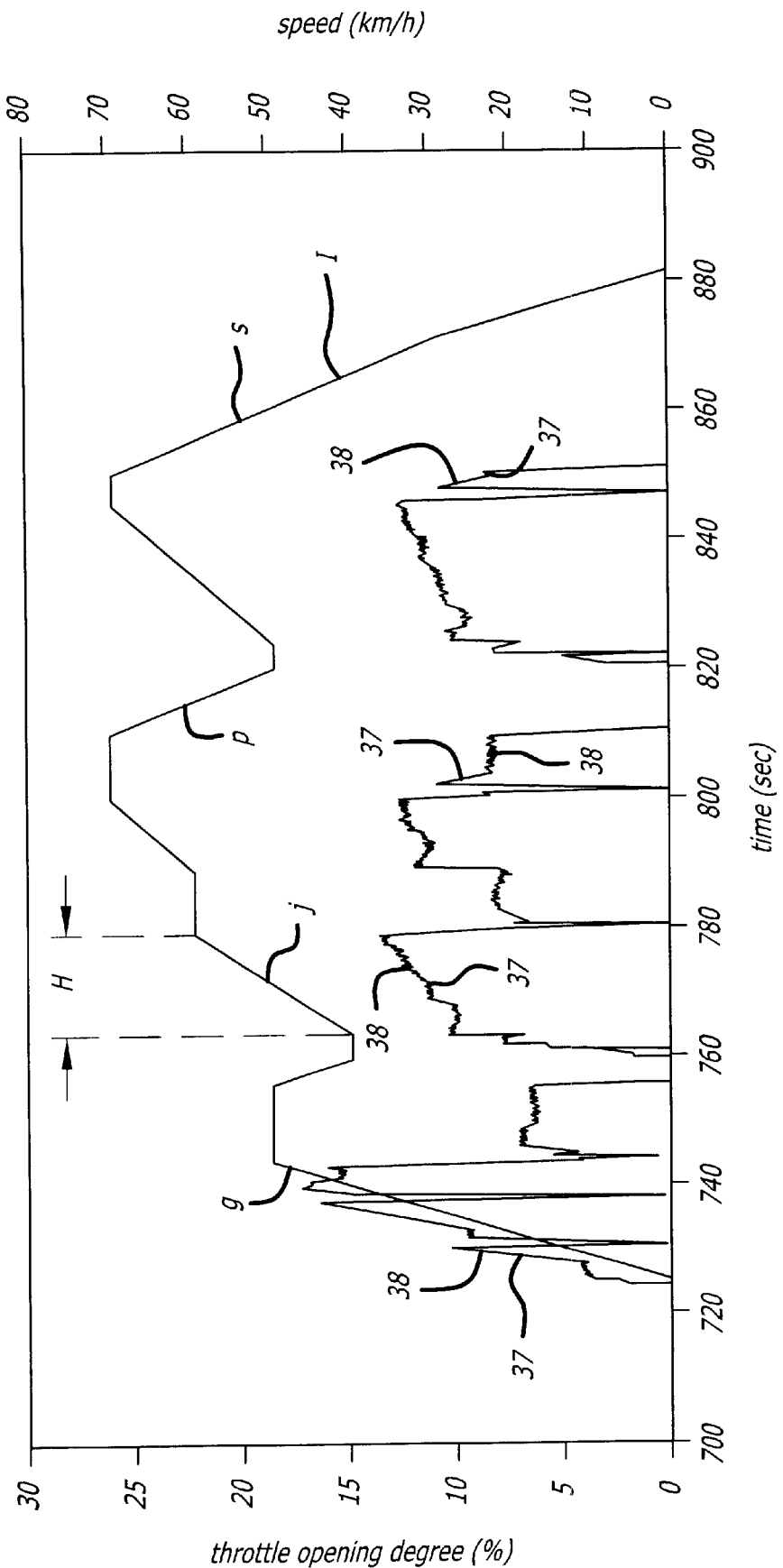
FIG. 10 is a graph relating data from an actual vehicle running at varying throttle opening degrees on the chassis dynamo to data simulated by the second invention.

FIG. 8 is a graph showing learned data for preparing a learning map of the second invention and learned data for preparing a conventional learning map. FIG. 4 shows the engine testing apparatus 1 constituting a vehicle simulation system carried out on a stage. FIG. 9 shows a variation in throttle valve operating speed obtained from the actual vehicle running on the chassis dynamo based on a running speed pattern J of a driving mode differing from a running speed pattern I of a driving mode employed in FIG. 11. FIG. 10 shows the relation between the actual vehicle data 38 showing a variation in throttle opening degree in the actual vehicle running on the chassis dynamo and data 37 simulated by the present invention.

In FIG. 4, the output shaft 2a of the engine 2 under test (simply "engine" hereinafter) and the driving shaft 3a of the dynamometer 3 are detachably connected to each other through the clutch 4. The dynamo controller 3' controls the dynamometer 3. The throttle actuator 5 controls the throttle opening degree of the engine 2. The computer 6 controls the dynamo controller 3' and the throttle actuator 5 through the interface 7.

Symbols 8 and 9 respectively represent the torque measuring device and the torque amplifier. The symbol 10 represents a clutch actuator.

As a first step for preparing a learning map, a variation in operating speed of the throttle valve which opens and closes in association with the accelerator pedal is obtained from the actual vehicle running on the chassis dynamo in corresponding manner to variation in speed in the running speed pattern I of the driving mode.

Figure 11:
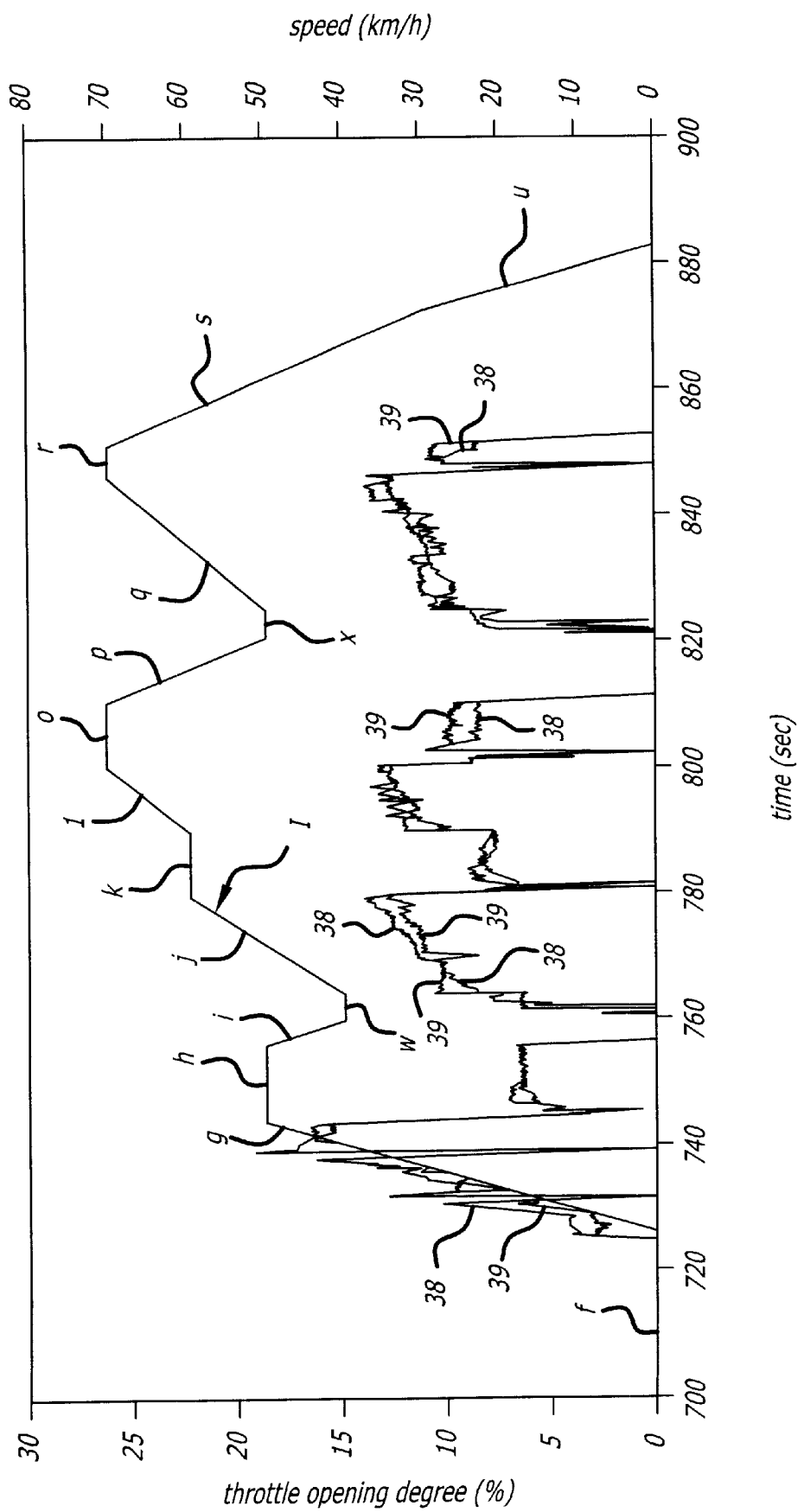
FIG. 11 is a graph relating data from an actual vehicle data running at varying throttle opening degrees on the chassis dynamo to data simulated by a conventional method.

For the sake of convenience, a method for obtaining the variation in the throttle valve operation speed and then, from this result, calculating the average value of the throttle valve opening direction and the average value of the throttle valve closing direction will be explained for a case in which it is obtained from the running speed pattern J of the simplified driving mode as shown in FIG. 9 not from the running speed pattern I of the driving mode shown in FIGS. 10 and 11. This is because even when the running speed pattern I is employed, the average value can be obtained by the same method.

In FIG. 9, the running speed pattern J is set to such a target value that the speed passes through a transient portion W of an acceleration (transient) straight 31 which varies straightly from an idling portion Q of a constant speed (steady) straight line 30, and again reaches a constant speed portion E of a constant speed straight line 32, and further reaches a transient portion R of a deceleration (transient) straight line 33 which straightly varies from the constant speed portion E.

During the actual vehicle running on the chassis dynamo, a variation of the throttle valve operating speed is obtained in corresponding manner to the variation in speed during the running speed pattern J. The symbol 34 represents variation data of the obtained throttle valve operating speed.

Next, the average value of the throttle valve opening direction and the average value of the throttle valve closing direction are calculated from the variation data 34.

The average value S of the throttle valve opening direction is arithmetical average value obtained by dividing a total sum of data $F_1 \ldots F_n$ of portion higher than the horizontal axis X (Y >O) by the number of data (n).

The average value G of the throttle valve closing direction is an arithmetic average value obtained by dividing a total sum of data $P_1 \ldots P_m$ of portion lower than the horizontal axis X (Y<O) by the number of data (m).

The torque curve is obtained by operating the throttle valve in its opening direction (the throttle opening degree is continuously varied from 0 to 100%) in a state where the engine rotation number is kept constant (e.g., 1500 rpm) at the representative value S. That is, the throttle valve is varied from the fully closed position to the fully opened position at the constant speed shown with the representative value S, thereby obtaining the torque curve 35 shown in FIG. 8.

Further, using a plurality of engine rotation numbers differing from 1500 rpm, torque curves (not shown) are obtained by the same method. For example, while maintaining the engine rotation number at 2000 rpm, the throttle valve is operated in the opening direction (the throttle opening degree is continuously varied from 0 to 100%) at the representative value S, and the torque curve is obtained. Based on the obtained torque curves, a map for the throttle valve opening direction is prepared. The following Table 3 is a prepared learning map.

TABLE 3

| $N_m$ | rpm 1500 | rpm 2000 | rpm 2500 | rpm 3000 | rpm 3500 |
|---|---|---|---|---|---|
| −40 | 0 | 0 | 0 | 0 | 0 |
| −35 | 0 | 0 | 0 | 0 | 0 |
| −30 | 0 | 0 | 0 | 0 | 0 |
| −25 | 0 | 0 | 0 | 165 | 278 |
| −20 | 0 | 45 | 112 | 262 | 345 |
| −15 | 30 | 135 | 202 | 330 | 435 |
| −10 | 82 | 195 | 284 | 397 | 465 |
| −5 | 132 | 247 | 344 | 412 | 480 |
| 0 | 180 | 300 | 367 | 435 | 517 |
| 20 | 329 | 435 | 517 | 592 | 683 |
| 40 | 464 | 563 | 659 | 742 | 818 |
| 60 | 577 | 683 | 780 | 893 | 983 |
| 80 | 726 | 818 | 915 | 1050 | 1148 |
| 100 | 930 | 1065 | 1162 | 1266 | 1350 |
| 120 | 1364 | 1530 | 1529 | 1597 | 1680 |
| 140 | 4096 | 4096 | 4096 | 3059 | 2557 |
| 160 | 4096 | 4096 | 4096 | 4096 | 4096 |
| 180 | 4096 | 4096 | 4096 | 4096 | 4096 |
| 200 | 4096 | 4096 | 4096 | 4096 | 4096 |

On the other hand, the torque curve is obtained by operating the throttle valve in its closing direction at the representative value G in a state where the engine rotation number is kept constant (e.g., 1500 rpm). That is, the throttle valve is varied from the fully closed position to the fully opened position at the constant speed shown with the representative value G. Thereby, the throttle opening degree is continuously varied from 100 to 0%, and the torque curve 36 shown in FIG. 8 is obtained. In this case also, using a plurality of engine rotation number differing from 1500 rpm, torque curves (not shown) are obtained by the same method.

Based on the obtained torque curves, a map for the throttle valve closing direction is prepared. The following Table 4 is a prepared learning map.

TABLE 4

| $N_m$ | rpm 1500 | rpm 2000 | rpm 2500 | rpm 3000 | rpm 3500 |
|---|---|---|---|---|---|
| −40 | 0 | 0 | 0 | 0 | 0 |
| −35 | 0 | 0 | 0 | 0 | 0 |
| −30 | 0 | 0 | 0 | 0 | 0 |
| −25 | 0 | 0 | 0 | 153 | 270 |
| −20 | 0 | 35 | 102 | 260 | 337 |
| −15 | 20 | 125 | 192 | 320 | 425 |
| −10 | 72 | 185 | 274 | 387 | 415 |
| −5 | 125 | 237 | 334 | 402 | 470 |
| 0 | 170 | 290 | 357 | 425 | 497 |
| 20 | 319 | 425 | 507 | 582 | 673 |
| 40 | 454 | 553 | 649 | 732 | 808 |
| 60 | 567 | 673 | 770 | 883 | 973 |
| 80 | 716 | 808 | 905 | 1040 | 1138 |
| 100 | 920 | 1055 | 1152 | 1256 | 1340 |
| 120 | 1354 | 1520 | 1519 | 1587 | 1670 |
| 140 | 4096 | 4096 | 4096 | 3049 | 2547 |
| 160 | 4096 | 4096 | 4096 | 4096 | 4096 |
| 180 | 4096 | 4096 | 4096 | 4096 | 4096 |
| 200 | 4096 | 4096 | 4096 | 4096 | 4096 |

In this manner, the throttle opening degree is outputted to control the engine 2 using the learning map for the throttle valve opening direction when the throttle valve is operated in the opening direction during the running speed pattern J, and using the learning map for the throttle valve closing direction when the throttle valve is operated in the closing direction. Therefore, it is possible to moderate the deviation of the throttle opening degree which is caused in the conventional technique, and high simulation accuracy can be obtained.

If this method is applied to the running speed pattern I shown in FIG. 10, the following information can be derived from FIG. 10. In FIG. 10, elements having the same symbols as those shown in FIG. 11 are the same elements or similar elements. The symbol 38 represents actual vehicle data showing a variation of the throttle opening degree for the actual running on the chassis dynamo prepared based on the running speed pattern I of the driving mode. The symbol 37 represents data simulated by this invention. From FIG. 10, it can be found that data 37 almost coincide with data 38.

That is, (1) For example, the portion of data 37, which corresponds to the acceleration straight line e, coincides with the portion of data 38, which corresponds to the acceleration straight line e. This means that reproduction of the engine state is enhanced in the transient portion H.

(2) Similarly, for example, both data 37 and data 38, which correspond to the deceleration straight line i, also coincide.

(3) The same phenomenon is generated also in the acceleration straight line b and the deceleration straight line 1.

From the learning maps, a target throttle (accelerator) opening degree having high accuracy in engine control can be determined. For example, when the target engine rotation number is 1700 rpm, when the desired target torque $N_m$ is 30, and when the throttle valve is operated in the opening direction, a value of the throttle (accelerator) opening degree for generating the target torque $N_m$ can be determined from values of 329, 464, 435 and 563 by referring to the learning map shown in Table 3. On the other hand, when the target engine rotation number is 1700 rpm, when the desired target torque $N_m$ is 30, and when the throttle valve is operated in the closing direction, a value of the throttle (accelerator) opening degree for generating the target torque $N_m$ can be determined from values of 319, 454, 425 and 553 which are different from those when the throttle is operated in the opening direction by referring to the learning map of Table 4 instead of Table 3.

In each of the above embodiments, the learning map preparing method for the engine testing apparatus 1 is described. However, the first invention can also be applied to a vehicle testing apparatus using a chassis dynamometer.

FIG. 7 shows one example of the vehicle testing apparatus. The symbol 21 represents a rotation roller on which the driving wheel 22a of a vehicle 22 under test is mounted, and the symbol 23 represents a chassis dynamometer operatively connected to the rotation roller 21 through the shaft 24. The chassis dynamometer 23 corresponds to the dynamometer 3 of the engine testing apparatus 1. The symbol 25 represents a flywheel provided on a shaft 24, and the symbol 26 represents a speed sensor provided on the shaft 24. The speed sensor 26 corresponds to a sensor (not shown) for outputting a rotation measurement value for the engine testing apparatus 1 shown in FIG. 4. The sensor is provided in an engine 2 of the engine testing apparatus 1 shown in FIG. 4. The symbol 27 represents a torque sensor provided in the chassis dynamometer 23. The torque sensor 27 corresponds to the torque measuring device 8 of the engine testing apparatus 1. The symbol 28 represents a running resistance generator for generating a target running resistance signal T corresponding to an actual running speed signal v sent from the speed sensor 26. The symbol 29 represents a chassis dynamo controller for driving and controlling the chassis dynamometer 23 such that a running resistance (target running resistance) corresponding to the actual running speed is applied to the driving wheel 22a based on a difference signal between an actual running resistance signal t sent from the torque sensor 27 and a target running resistance signal T sent from the running resistance generator 28. The chassis dynamo controller 29 corresponds to the dynamo controller 3' of the engine testing apparatus 1. The symbol X represents a driver's aid display unit on which a set target driving pattern $V_o$ (corresponding to running speed pattern I in FIGS. 10 and 11, and the running speed pattern J in FIG. 9) and a variation of data position V showing a real time driving state (actual running speed signal v of current time sent from the speed sensor 26) are displayed for the driver of the vehicle.

As described above, in accordance with the second embodiment, the average value of throttle valve operating speed is calculated from variation of the throttle valve operation speed. The average value of the throttle valve operating speed obtained by the calculation is determined as a representative value corresponding to the throttle valve operating speed in a driving mode. The throttle valve is operated in a state where the engine rotation number is made constant by the representative value. The torque curves are described by a plurality of different engine rotation numbers, and a map is prepared for determining the throttle opening degree based on the obtained torque curves. Therefore, it is possible to control the engine to a throttle valve opening degree corresponding to the throttle valve operating speed, and high simulation accuracy can be obtained.

In particular, the throttle valve is operated at the representative value of the throttle valve operating speed. The data for preparing the learning map is prepared by storing the torque curve when the throttle valve is operated from the fully closed position to the fully opened position at the representative value (constant speed) and by storing the torque curve when the throttle valve is operated from the fully open position to the fully closed position at the representative value (constant speed). Therefore, it is possible to control the engine by a throttle valve opening degree corresponding to both the throttle valve opening direction and closing direction, and high simulation accuracy can be obtained.

Figure 12:
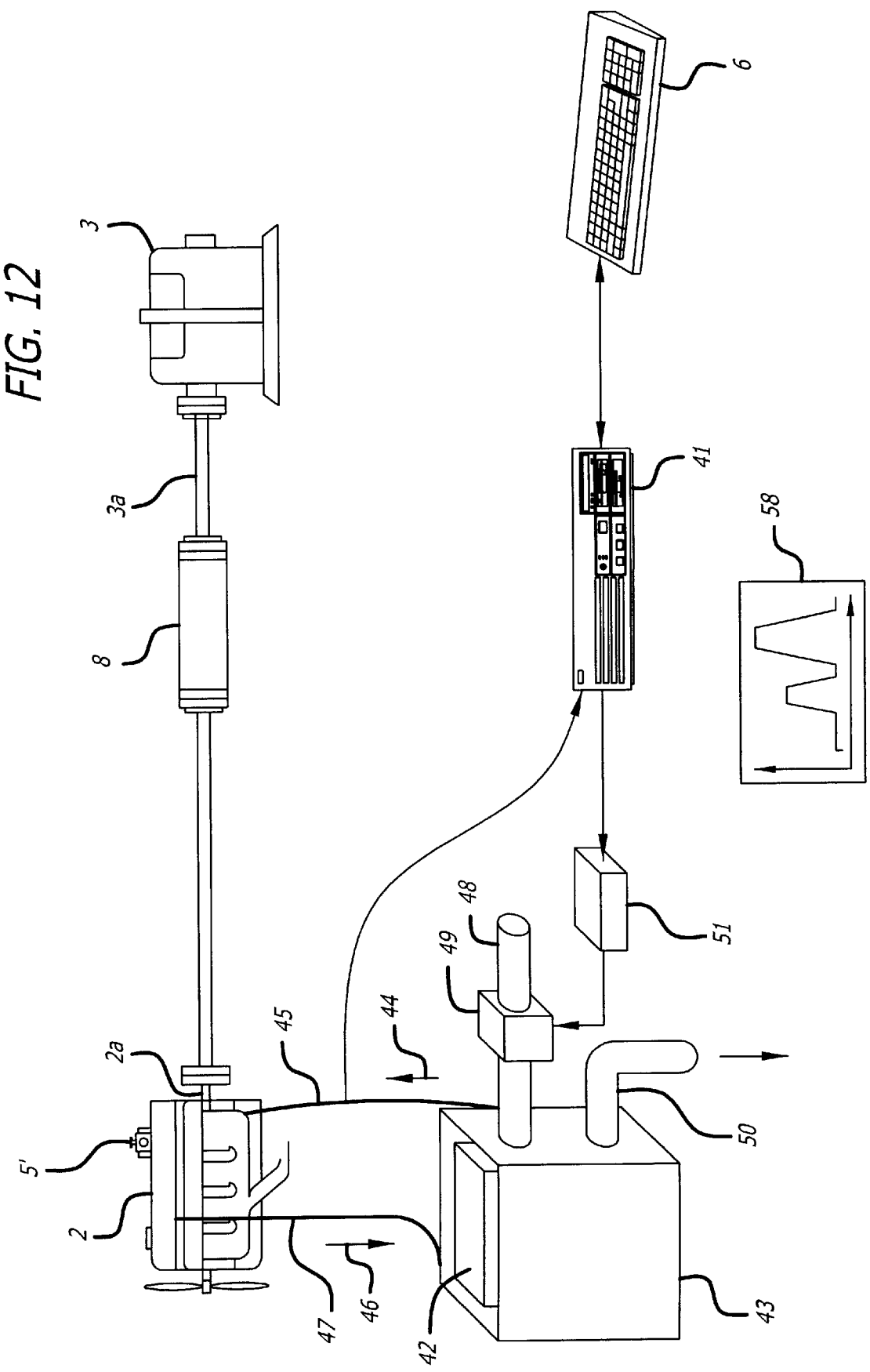
FIG. 12 is a schematic view showing a structure of a system for controlling temperature of a cooling tank of a radiator mounted to an engine under test.
Figure 13:
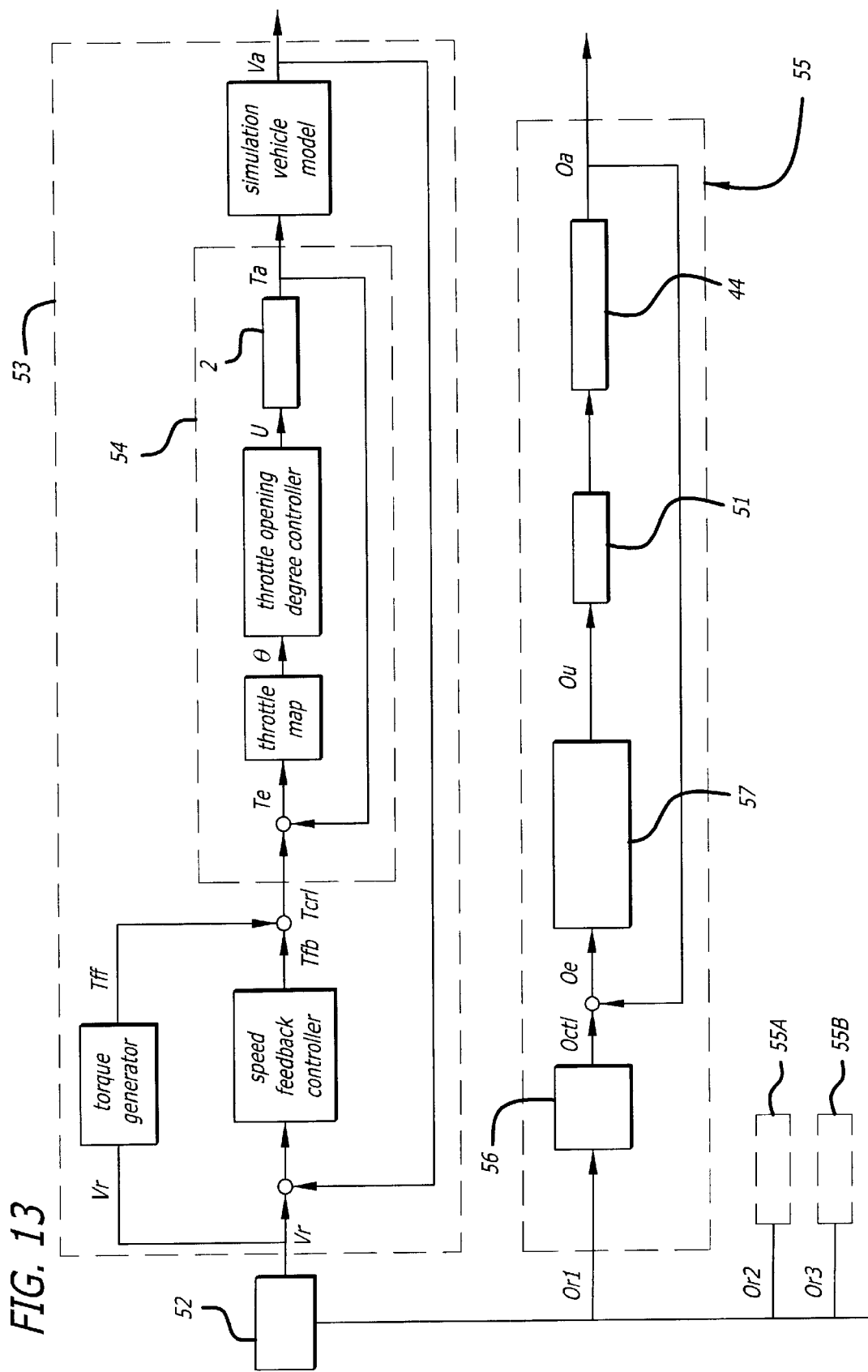
FIG. 13 is a block graph showing one example of a control system for an engine testing apparatus.

Next, an embodiment of a third invention is described with reference to the drawings. FIGS. 4, 12 and 13 show one embodiment of this invention. First, FIG. 4 schematically shows the engine testing apparatus I according to the third invention. In FIG. 4, the symbol 2 represents the engine under test, the symbol 3 represents the dynamometer connected to the output section of the engine under test. The dynamometer 3 is controlled by the dynamo controller 3'. In this embodiment, the output shaft 2a of the engine 2 under test and the driving shaft 3a of the dynamometer 3 are detachably connected to each other through the clutch 4. The symbol 10 represents the clutch actuator which drives clutch 4. The symbol 5' represents the throttle of the engine 2 under test, the throttle 5' is driven by the throttle actuator 5, and the opening degree of the throttle is controlled. The symbols 8 represents the torque sensor provided in the driving shaft 3a of the dynamometer 3, and the symbol 9 represents the torque amplifier which appropriately amplifies the output of the torque sensor 9.

The symbol 6 represents the computer as a simulator which controls the engine testing apparatus 1, and symbol 41 represents a signal conditioner unit. The computer 6 performs a computation based on an input from an input apparatus (not shown) and based on signals from various sensor such as the torque sensor 8 provided in the apparatus. The computer outputs commands to various portions of the engine testing apparatus 1. The signal conditioner unit 41 is an interface having an AD converting function and a DA converting function. The signal conditioner unit 41 AD-converts signals from various sensors such as a torque sensor 8, DA-converts commands from the computer 6, and output commands to various portion of the engine testing apparatus I such as the dynamo controller 3', the clutch actuator 10 and the throttle actuator 5.

The above-described structure is the same as that of the conventional engine testing apparatus. Characteristics of the third invention resides in that commands based on a temperature pattern are outputted to various temperature adjusting devices provided around the engine 2 under test from the computer 6 which controls the engine testing apparatus 1.

FIG. 12 is a schematic view showing a system for controlling a temperature of a cooling tank of a radiator mounted to an engine 2 under test.

In FIG. 12, symbol 42 represents a radiator mounted to the engine 2 under test, and symbol 43 represents a radiator tank for cooling the radiator 42.

The engine 2 under test and the radiator 42 are connected to each other through a water-sending pipe 45 for supplying cold water 44 from the radiator to the engine 2 under test and a water-returning pipe 47 for returning warm water 46 from the engine 2 to the radiator 42. Symbol 48 represents a water-supplying pipe connected to the radiator tank 43. The water-supplying pipe 48 is connected to a water source (not shown) and includes a solenoid valve 49. Symbol 50 represents a water-discharging pipe connected to the radiator tank 43. Symbol 51 represents a temperature adjusting device for outputting a signal for opening and closing the solenoid valve 49. By appropriately opening or closing the solenoid valve 49, the cold water from the water source is supplied to the radiator tank 43, thereby cooling the radiator 42.

FIG. 13 is a block diagram showing one example of a control system for the engine testing apparatus 1. In FIG. 13, symbol 52 represents a target pattern generator which is provided in the computer 6 so as to output a target speed signal Vr for allowing the engine 2 under the test to run in the actual vehicle at a predetermined running pattern. Symbol 53 represents a simulation vehicle control system which converts a target speed signal Vr from the target pattern generator 52 into a control target torque and controls the torque control system 54 including the engine 2 under test, so that the engine 2 under test outputs in a state where the actual vehicle running is simulated. The structure and function of each of the target pattern generator 52 and the simulation vehicle control system 53 are the same as those of the conventional engine testing apparatus.

Symbol 55 represents a temperature control system for controlling the temperature of the engine cooling water 44 supplied to the engine 2 under test to a predetermined temperature. The temperature control system 55 includes a delay correction control circuit 56 for correcting a response delay of a measured temperature with respect to a temperature instruction value of the temperature adjusting device 51. The temperature control system 55 further includes a temperature feedback controller 57. A temperature target value Orl, which is outputted from the target pattern generator 52, is inputted to the delay correction control circuit 56. That is, the target pattern generator 52 outputs the temperature target value Orl to the temperature control system 55 in accordance with a time series temperature pattern (the horizontal axis shows time, and the vertical axis shows temperature (° C.)) shown with the symbol 58 in FIG. 12.

The operation of the engine testing apparatus having the above-described structure is described. In the computer 6 which controls the engine testing apparatus 1, a time series pattern (time series temperature pattern) 58 of a temperature of the engine cooling water obtained when the actual vehicle running was tested in accordance with the running pattern on the chassis dynamo is previously stored as a program. The time series temperature pattern 58 is inputted to the target pattern generator 52, thereby outputting the temperature target value Orl of the engine cooling water 44. The temperature target value Orl is inputted to the cooling water temperature control system 55. Since the cooling water temperature control system 55 is provided with the delay correction control circuit 56, the delay correction control circuit 56 early outputs a temperature target value Octl so as to correct the response delay of the measuring temperature with respect to the temperature instruction value of the temperature adjusting device 51.

The temperature target value Octl, the current actually measured temperature Ta and a deviation Oe are PI-controlled for example by the temperature feedback controller 57, and a control signal is outputted to the temperature adjusting device 51. Based on this control signal, an opening signal or a closing signal is sent to the solenoid valve 49 from the temperature adjusting device 51, and the temperature of the engine cooling water 44 is varied with time in the same way as that of the actual running test.

As explained above, temperatures around the engine 2 under test include the engine cooling water temperature, the fuel temperature, the air intake temperature, the exhaust gas temperature and the lubricant temperature. It is necessary to control these temperatures respectively, and there are provided temperature adjusting devices (not shown). Therefore, in FIG. 13, as shown with symbols 55A, 55B, . . . , if the temperature control systems, which respectively corresponds with the fuel temperature and the like are constituted in the same way as the temperature control system 55, and if they are controlled in the same manner, it is possible to reproduce the temperature environment of the actual vehicle of the various portions around the engine 2 under the test, and the engine behavior close to the actual vehicle can be obtained. Therefore, high simulation accuracy can be obtained.

In the above embodiment, in regards to the temperature control systems 55, 55A, 55B, . . ., commands based on the temperature pattern obtained from temperature data of various portions around the engine when the actual vehicle running is tested in accordance with the running pattern on the chassis dynamo are set, but a temperature pattern based on a virtual pattern may be set. In this case, it is possible to arbitrarily carry out the simulation of a virtual vehicle by adding various conditions.

As explained above, according to the engine testing apparatus described in claim 4, a temperature around the engine can be reproduced in the same way as the actual vehicle running on the chassis dynamo, the engine behavior is extremely close to the actual vehicle running, the accuracy of the simulation can be enhanced, and the engine performance can be tested in a state close to the actual case.

According to the engine testing apparatus described in claim 5, it is possible to simulate a virtual vehicle, and it is possible to utilize the test in design of various engine.

What is claimed is:

1. A map preparing method used for an engine testing apparatus or a vehicle testing apparatus comprising the steps of:
   varying a throttle valve from a fully closed position to a fully open position while maintaining an engine at a constant rotation;
   storing an output torque of the engine at at least three different engine RPMs relative to an throttle valve position;
   determining each of the obtained torque curves as actual machine data;
   and preparing a map based on the actual machine data, comprising:
      describing each of the torque curves on the same X–Y plane when preparing a map based on the actual machine data;
      converting actual machine data function for describing torque approximation curves with respect to throttle opening degrees (X axis) on the same X–Y plane while making approximations to the torque curves;
      determining the existence of intersecting torque approximation curves; and
      automatically correcting one of the torque approximation curves determined to be peculiar such that a value of a y-component of the torque approximation curve which appears peculiar among the intersecting torque approximation curves in the determining step assumes a median value of y-components of each of the vertically adjacent torque approximation curves.

2. A map preparing method used for an engine testing apparatus or a vehicle testing apparatus comprising the steps of:

calculating an average value of throttle valve operating speed from variation of the throttle valve operation speed;

determining the average value of the throttle valve operating speed obtained by the calculation as a representative value corresponding to the throttle valve operating speed in a driving mode;

operating the throttle valve in a state where the engine rotation number is made constant by the representative value and describing the torque curves with a plurality of different engine rotation numbers;

and preparing a map for determining the throttle opening degree based on the obtained torque curves.

3. A map preparing method used for an engine testing apparatus or a vehicle testing apparatus comprising the steps of:

calculating an average value for a throttle valve opening direction and an average value for a throttle valve closing direction from variations of a throttle valve operation speed;

determining the average value of the throttle valve in the throttle valve opening direction obtained by the calculation as a representative value corresponding to the throttle valve operating in the throttle valve opening direction in a driving mode;

operating the throttle valve in its opening direction in a state where the engine rotation number is made constant by the representative value and describing the torque curves with a plurality of different engine rotation numbers;

preparing a map in the throttle valve opening direction based on the obtained torque curves;

determining the average value of the throttle valve in the throttle valve closing direction obtained by the calculation as a representative value corresponding to the throttle valve operating in the throttle valve closing direction in a driving mode;

operating the throttle valve in its closing direction in a state where the engine rotation number is made constant by the representative value and describing the torque curves with a plurality of different engine rotation numbers; and preparing a map in the throttle valve closing direction based on the obtained torque curves.

* * * * *